(12) United States Patent
Orubor

(10) Patent No.: US 8,776,304 B2
(45) Date of Patent: Jul. 15, 2014

(54) SELF-EVACUATING VACUUM DEVICE

(76) Inventor: Lawrence Orubor, Calgary (CA)

( * ) Notice: Subject to any disclaimer, the term of this patent is extended or adjusted under 35 U.S.C. 154(b) by 0 days.

(21) Appl. No.: 13/349,550

(22) Filed: Jan. 12, 2012

(65) Prior Publication Data

US 2012/0117750 A1    May 17, 2012

Related U.S. Application Data

(62) Division of application No. 12/062,470, filed on Apr. 3, 2008, now abandoned.

(60) Provisional application No. 60/910,186, filed on Apr. 4, 2007.

(51) Int. Cl.
*A47L 7/00* (2006.01)
*A47L 9/00* (2006.01)

(52) U.S. Cl.
USPC ................................. 15/320; 15/322; 15/347

(58) Field of Classification Search
USPC ........................................................... 15/320
See application file for complete search history.

(56) References Cited

U.S. PATENT DOCUMENTS

| | | |
|---|---|---|
| 2,589,020 A | 3/1952 | North |
| 2,841,923 A | 7/1958 | Dickison |
| 2,928,601 A | 3/1960 | Fenimore |
| 3,680,504 A | 8/1972 | Seebald |
| 3,753,408 A | 8/1973 | Zimmerman |
| 3,770,204 A | 11/1973 | Schuster |
| 3,774,260 A | 11/1973 | Emus, Jr. |
| 3,808,631 A | 5/1974 | Shibata et al. |
| 3,818,537 A | 6/1974 | Evans |
| 3,940,826 A | 3/1976 | Phillips et al. |
| 3,968,937 A | 7/1976 | Miller |
| 4,152,080 A | 5/1979 | Clark, Jr. |
| 4,302,040 A | 11/1981 | Lazar |
| 4,478,448 A | 10/1984 | Albert |
| 4,549,329 A | 10/1985 | St. Clair |
| 4,610,048 A | 9/1986 | Ishihara |
| 4,744,380 A | 5/1988 | Sheriff |
| 4,788,738 A | 12/1988 | Monson et al. |
| 4,809,396 A | 3/1989 | Houser |
| 4,863,108 A | 9/1989 | Mitchell |
| 4,948,266 A | 8/1990 | Bencic |

(Continued)

FOREIGN PATENT DOCUMENTS

| | | |
|---|---|---|
| CA | 1178455 | 4/1998 |
| CA | 2453737 | 6/2005 |

(Continued)

OTHER PUBLICATIONS

Supplemental European Search Report for PCT/CA2005/001929 dated Jul. 28, 2008, 12 pages.

(Continued)

*Primary Examiner* — Monica Carter
*Assistant Examiner* — Stephanie Berry
(74) *Attorney, Agent, or Firm* — Blakely, Sokoloff, Taylor & Zafman LLP

(57) ABSTRACT

A device for collecting waste and for disintegrating and self-cleaning and evacuating waste, the device including a waste collection system for collecting the waste, a fluid dispensing system for disintegrating the waste which is collected by the waste collection system, and a discharge system for evacuating the disintegrated waste from the device.

9 Claims, 4 Drawing Sheets

(56) References Cited

U.S. PATENT DOCUMENTS

| | | |
|---|---|---|
| 4,949,424 A | 8/1990 | Shero |
| 4,953,254 A | 9/1990 | Kohl et al. |
| 4,957,131 A | 9/1990 | Robinson |
| 5,206,970 A | 5/1993 | Johnson |
| 5,349,722 A | 9/1994 | Chayer |
| 5,392,490 A | 2/1995 | Monson |
| 5,432,975 A | 7/1995 | Hilmanowski |
| 5,500,978 A | 3/1996 | Levine |
| 5,540,469 A | 7/1996 | Albert |
| 5,560,075 A | 10/1996 | Jankowski |
| 5,561,884 A | 10/1996 | Nijland et al. |
| 5,866,186 A | 2/1999 | Bazan |
| 5,970,572 A | 10/1999 | Thomas |
| 6,009,596 A | 1/2000 | Buss et al. |
| 6,032,995 A | 3/2000 | Barbaro |
| 6,077,362 A | 6/2000 | Reed |
| 6,079,076 A | 6/2000 | Berfield |
| 6,112,366 A | 9/2000 | Berfield |
| 6,171,375 B1 | 1/2001 | Howie |
| 6,347,428 B1 | 2/2002 | Shimko et al. |
| 6,367,714 B1 | 4/2002 | Smoot |
| 6,493,903 B1 | 12/2002 | Super |
| 6,638,364 B2 | 10/2003 | Harkins et al. |
| 6,874,197 B1 | 4/2005 | Conrad et al. |
| 7,073,226 B1 | 7/2006 | Lenkiewicz et al. |
| 7,225,503 B1 | 6/2007 | Lenkiewicz et al. |
| 7,272,869 B1 | 9/2007 | Robinson |
| 7,341,612 B2 | 3/2008 | Nhan et al. |
| 2001/0005919 A1 | 7/2001 | Worden et al. |
| 2002/0042965 A1 | 4/2002 | Salem et al. |
| 2002/0066153 A1 | 6/2002 | Sclafani et al. |
| 2002/0092122 A1 | 7/2002 | Zahuranec |
| 2003/0131439 A1 | 7/2003 | Wen |
| 2003/0159233 A1 | 8/2003 | Oh |
| 2004/0083571 A1 | 5/2004 | Yoo et al. |
| 2004/0083572 A1 | 5/2004 | Song |
| 2004/0088816 A1 | 5/2004 | Shimizu et al. |
| 2005/0015916 A1* | 1/2005 | Orubor .................. 15/320 |
| 2006/0081027 A1* | 4/2006 | Rhodes .................. 71/11 |
| 2006/0137132 A1* | 6/2006 | Orubor .................. 15/344 |
| 2007/0204887 A1 | 9/2007 | Wood |

FOREIGN PATENT DOCUMENTS

| | | |
|---|---|---|
| DE | 32 25 602 | 1/1984 |
| EP | 0 456 084 | 11/1991 |
| EP | 0 847 721 | 6/1998 |
| GB | 429106 | 5/1935 |
| GB | 2 114 878 | 9/1983 |
| GB | 2145620 | 4/1985 |
| WO | WO 2004/107947 | 12/2004 |

OTHER PUBLICATIONS

PCT International Search Report for PCT/CA2004/000841, dated Jul. 6, 2004, 4 pages.

The Patent Office of the People's Republic of China, First Office Action for Application No. 200480019209.7, Issuing date Jul. 6, 2007, 7 pages.

The State Intellectual Property Office of the People's Republic of China, First Office Action for "Self-Cleaning Wet Dry Vacuum Cleaning Device", Application No. 200580047337.7, Issuing date Feb. 13, 2009, 20 pages.

PCT International Search Report and Written Opinion for PCT/CA2005/001929 dated Apr. 6, 2006, 12 pages.

* cited by examiner

SELF-EVACUATING VACUUM DEVICE

CROSS-REFERENCE TO OTHER APPLICATIONS

This application claims priority from U.S. patent application Ser. No. 12/062,470, filed on Apr. 3, 2008, which claims priority to U.S. Provisional Patent Application No. 60/910,186, filed on Apr. 4, 2007.

FIELD OF THE INVENTION

The present invention relates generally to a self-evacuating and self-cleaning vacuum device. More particularly, the present invention relates to a device for collecting, disintegrating and evacuating waste.

BACKGROUND OF THE INVENTION

In the art, there have been a variety of cleaning devices capable of collecting either dry material (such as debris), wet material (such as medical spills or animal feces) or both.

As an example, U.S. Pat. No. 4,152,080 discloses an animal waste cleaning device including collection means which can be provided in various sizes to accommodate the collection of different sized pet waste. However, this device exposes operators to the waste and associated noxious fumes as some handling of the waste by the operators is required.

Further, tank-type vacuum cleaners used for suctioning dry material and liquids are known in the art. However, it is difficult to empty liquids from such tank-type vacuum cleaners. When the receptacle is full, the receptacle is removed and the contents are dumped out. If the receptacle is used to collect liquid material, the container may be very heavy so that lifting the tank to pour the contents into a sink or the like is difficult. Even tilting the container to pour the contents into a floor drain may be unwieldy when the liquid level in the receptacle is high.

There have been a number of other proposed solutions to try to help operators clean up dry or wet waste easily. For example, U.S. Pat. No. 6,079,076 describes vacuum cleaners having filter bags for capturing debris and wet material which sit inside the tank. However, it is difficult to empty liquid from such receptacles, and the filter bags may be costly.

Yet another method of expelling waste is described in U.S. Pat. No. 6,009,596 which describes vacuum cleaners having a pump impeller to expel liquid to empty the liquid easily from a tank used for collecting material. However, this device also suffers from difficulties emptying the collected waste, especially when the waste is in the form of a sludge.

SUMMARY OF THE INVENTION

It is an object of the present invention to teach a self-evacuating and self-cleaning vacuum device which is designed to maximize the convenience of use and which provides several advantages designed to meet the challenges of a vacuum device for a variety of forms of waste materials.

It is an object of the present invention to teach an exterior spray system to spray environmentally-friendly chemical fluid into the area from which the waste was collected.

In one aspect, the present invention provides a device for removing waste materials having an intake nozzle for accepting the waste materials; a vacuum for providing suction to the intake nozzle; a waste receptacle in communication with the intake nozzle for storing the waste materials which are vacuumed into the intake nozzle; and a discharge pump in communication with the waste receptacle for pumping the waste out of the device.

Preferably, the waste receptacle includes rotateable blades for disintegrating the waste in the waste storage receptacle in order to facilitate evacuation.

In a further aspect, the present invention provides a self-cleaning and evacuating vacuum cleaning device having an intake nozzle for accepting waste materials; a vacuum pump in communication with the intake nozzle for providing suction to the intake nozzle; a waste storage receptacle in communication with the intake nozzle for storing the waste vacuumed into the intake nozzle; a fluid reservoir for storing fluid, the fluid reservoir in fluid communication with a fluid delivery hose located in the interior of the intake nozzle; a chemical solution reservoir for storing concentrated solution, the chemical solution reservoir in fluid communication with a chemical solution delivery hose located in the exterior of the intake nozzle; a pump in communication with the fluid reservoir for dispensing fluid from the fluid reservoir; a spraying system for disintegrating the waste in the waste storage receptacle in order to facilitate evacuation; and a discharging pump in communication with the waste storage receptacle for evacuating the disintegrated waste from the waste storage receptacle.

Preferably, the intake nozzle includes a chemical solution delivery hose in fluid communication with the chemical solution reservoir for spraying the chemical fluid the target waste.

Preferably, the chemical solution reservoir has a one-way valve to prevent to waste within the chemical delivery hose from travelling back towards the intake nozzle.

Preferably, the fluid reservoir is in communication with an exterior spray system.

Preferably, the exterior spray system has an external delivery hose pump in communication with the fluid reservoir for dispensing fluid from the fluid reservoir; and a spray nozzle for spraying the fluid into an area from where the waste was collected.

Other aspects and features of the present invention will become apparent to those ordinarily skilled in the art upon review of the following description of specific embodiments of the present invention.

BRIEF DESCRIPTION OF THE DRAWINGS

Embodiments of the present invention will be described by way of example only, with references to the attached figures where.

DETAILED DESCRIPTION

Figure 1:
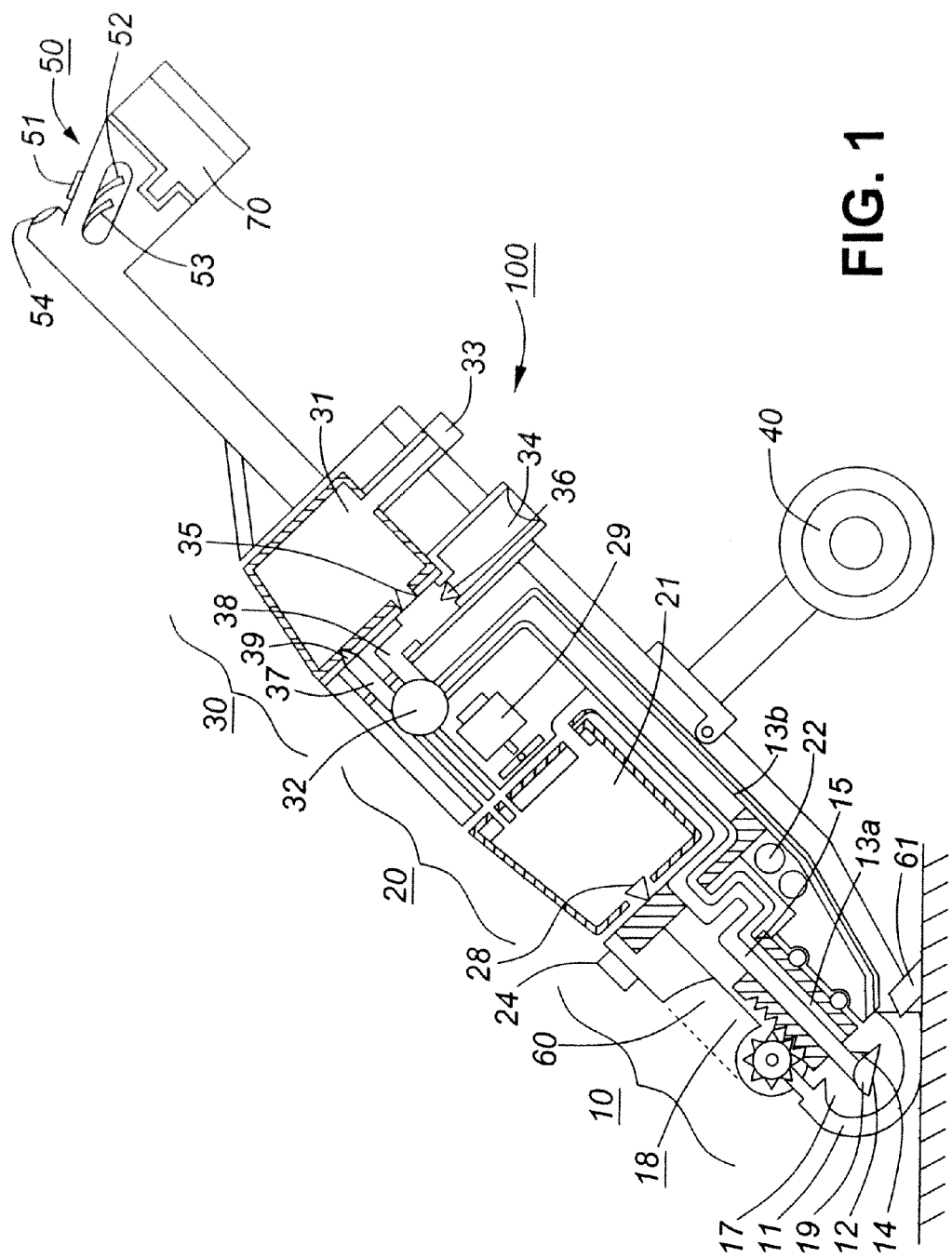
FIG. 1 is a partial cut-away perspective view of a device in accordance with the present invention.
Figure 2:
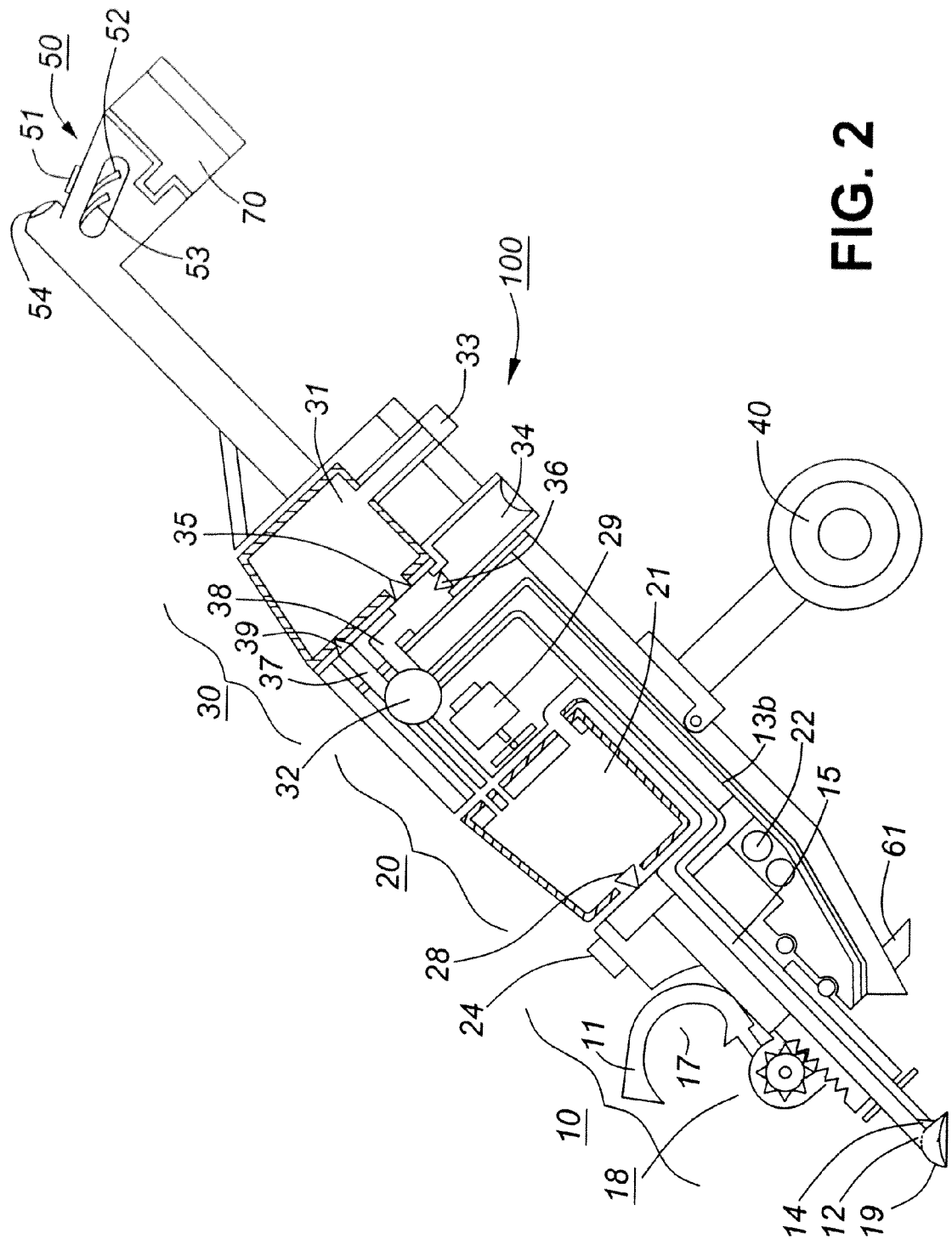
FIG. 2 is a partial cut-away perspective view of a device in accordance with a further embodiment of the present invention, deployed for use.

Referring to FIGS. 1 and 2, a device 100 generally includes a waste collection system 10, a fluid dispensing system 30, and a discharge system 20.

Waste Collection System

The waste collection system 10 includes an intake nozzle 12 for collecting waste, a cover lid 11 hinged to the body of the device 100 for covering the intake nozzle 12 when the device 100 is turned off and for retracting to expose the intake nozzle 12 during operation, and a collection hose 15 operatively connected to the intake nozzle 12 for allowing waste to travel from the intake nozzle 12 into a waste receptacle 21. The collection hose 15 includes a fluid delivery hose 13a in fluid communication with the fluid dispensing system 30 for spraying water or chemical fluid at the target waste such as animal feces. In addition, a fluid delivery hose 13b, located in the waste collection system 10, is in fluid communication with the fluid dispensing system 30 for cleaning the exterior of the intake nozzle 12.

A spray jet 14 or jets may be located in the collection hose 15 as shown in FIG. 1. Spray jets 14 are in fluid communication with fluid dispensing system 30 to begin breaking down waste, to clean the interior of the collection hose 15 or both.

Further, the intake nozzle 12 may include a cover grille 19. The cover grille 19 is located at the entrance of intake nozzle 12. The cover grille 19 prevents large materials (for example, pebbles, twigs or debris) from entering the intake nozzle 12 or the collection hose 15. If the intake nozzle 12 or the collection hose 15 does become clogged, the cover grille 19 can be opened (through the use of various mechanical means such as a trigger-operated piston or through the use of electrical means which are not shown) to allow such material to fall out of the intake nozzle 12 or out of collection hose 15. Add water pressure without opening cover.

In one embodiment, the cover lid 11 is in mechanical communication with the intake nozzle 12 through the use of a rack and pinion system 18 as shown in FIGS. 1 and 2. The result is that as the cover lid 11 is opened, the intake nozzle 12 will be mechanically moved to an operative extended position.

Fluid Dispensing System

The fluid dispensing system 30 generally includes a fluid reservoir 31 in communication with a fluid delivery pump 32 and a valve 35 located in the fluid reservoir 31 to control the supply of water. The fluid reservoir 31 also includes a connector 33 for supplying water from an external water hose (not shown). The fluid dispensing system 30 also includes a chemical reservoir 34 in communication with the fluid delivery pump 32, the chemical reservoir 34 including a valve 36 located in the chemical reservoir 34 to control the supply of chemical fluid. The fluid reservoir 31 may be in fluid communication with a water delivery hose 37 for dispensing clean water or other cleaning chemicals to various systems within the device 100 and the chemical reservoir 34 is in fluid communication with a chemical delivery hose 38 for dispensing chemical solution to various systems within the device 100.

The fluid dispensing system 30 may provide chemical solution to the fluid delivery hose 13a located within the intake nozzle 12 to help dissolve and separate waste material to increase the efficiency of the device 100. Such chemical solution may have a number of properties well suited to washing, breaking down, disintegrating, deodorizing, detoxifying, disinfecting or foaming the waste (or any combination of these). A chemical solution may be custom-designed based upon its intended use. In addition, the fluid dispensing system 30 provides water or chemical to the fluid delivery hose 13b located in the cover lid 11 thereby serving as a wash basin 17 for cleaning the intake nozzle 12 when the operator has finished using the device 100 to collect waste.

Optionally, a valve 39 may be connected with a siphon system (not shown) to supply clean water or other cleaning chemical for cleaning the interior of the waste receptacle 21 and for flushing out the entire discharge system 20.

The fluid reservoir 31 and the chemical reservoir 34 may be detachable.

The fluid dispensing system 30 (and particularly the fluid reservoir 31 and/or chemical reservoir 34) may optionally include a heating element or other heating device or means for heating the fluid in the fluid reservoir 31 and/or in the chemical reservoir 34 to provide for enhanced breakdown of the waste, sterilization or sanitation of contaminated surfaces, or enhanced efficiency of the fluids used (or any combination of the foregoing).

Discharge System

Figure 3:
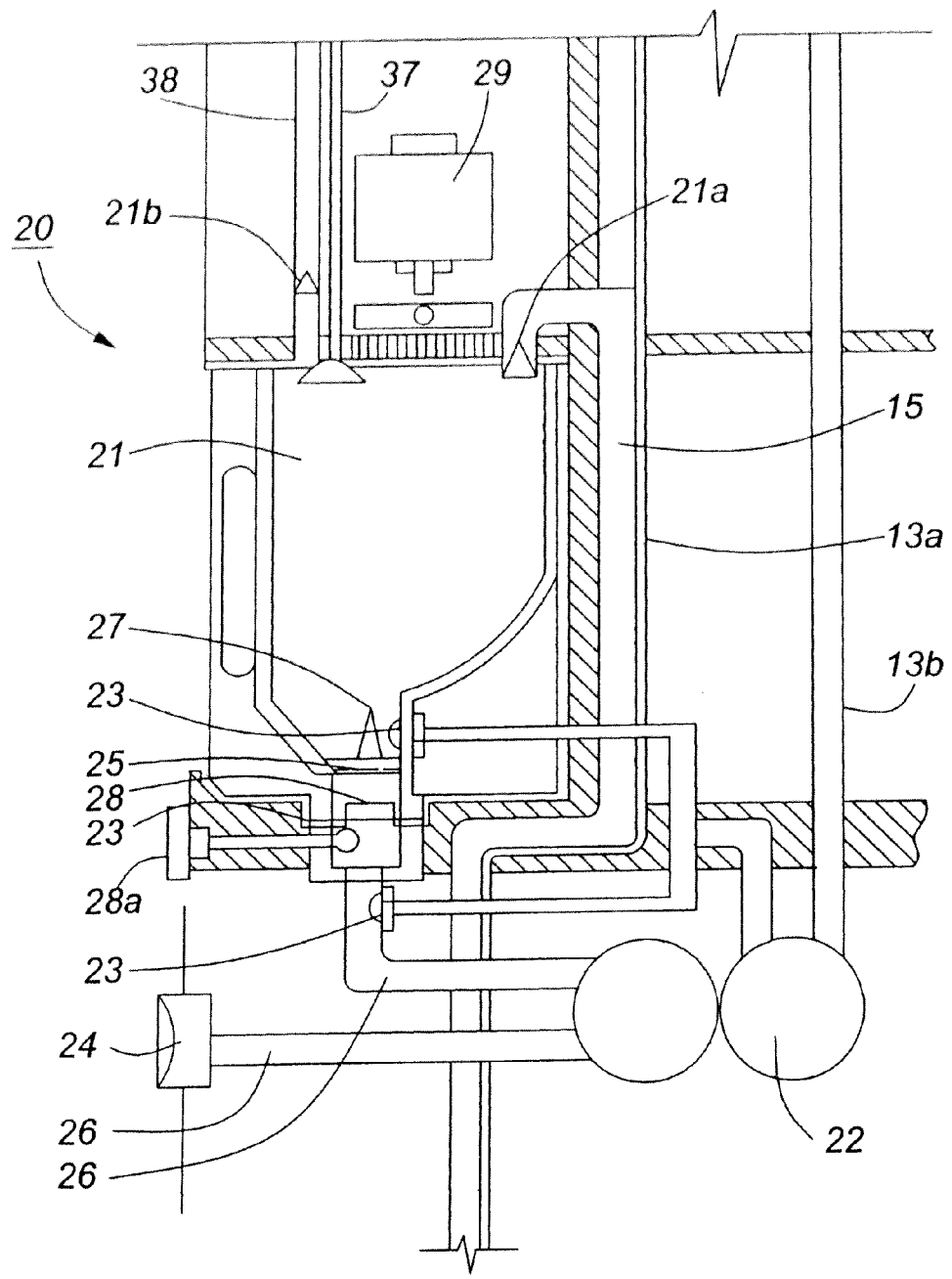
FIG. 3 is a partial cross section of a receptacle and discharge system in accordance with the present invention.
Figure 4:
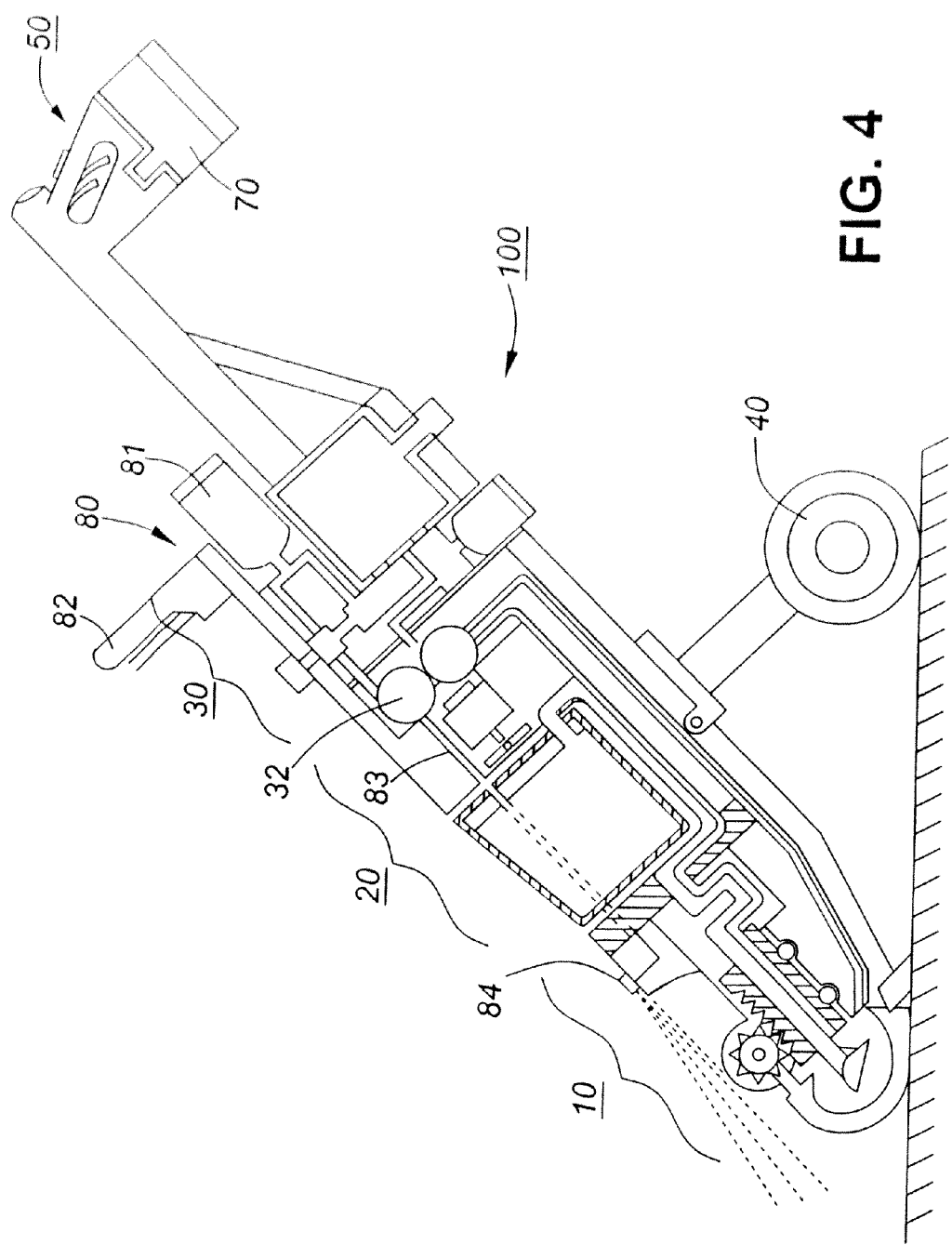
FIG. 4 is a partial cut-away perspective view of a device in accordance with a further embodiment of the present invention.

As shown in FIG. 3, the discharge system 20 is generally designed to evacuate waste from the device 100.

As waste is collected by the waste collection system 10 it is deposited into a waste receptacle 21 where it is stored until evacuated or otherwise dispensed. While waste is stored in the waste receptacle 21, water, chemicals (or both) may be added to accelerate or encourage the waste to break down further, make the waste more soluble and to help disintegrate the waste. One ordinarily skilled in the art will also appreciate that one or more of the many known methods of breaking down or disintegrating waste may be employed within the waste receptacle 21. By way of example only, in addition to adding water or chemicals, the waste may be further broken down or disintegrated by including an air pressure device (not shown) to apply blasts of air to the waste and for aerating the waste, by including any one of a number of agitation devices (such as tumbling portions of the waste receptacle 21, rotating vanes, mixers, etc.) (not shown) or any combination of the foregoing. Breaking down or disintegrating the waste in such a manner will decrease the load required to evacuate the waste.

In another embodiment, as shown in FIG. 3, the discharge system 20 may include rotateable blades 27 used to agitate and break down the waste. Any combination of mechanical or electrical agitators may be used as stated above. In addition to the rotateable blades 27 (or in the alternative), the discharge system 20 may include a rotateable housing (not shown) for either mixing or tumbling the waste located within the waste receptacle 21.

As shown in FIG. 3, the discharge system 20 includes a discharge pump 22 for transporting waste from the waste receptacle 21 through an outlet hose 26 to a discharge outlet 24 and ultimately to the exterior of the device 100.

In one embodiment, shown in FIG. 3, the discharge system 20 includes a cover grille 25 located within the waste receptacle 21 to prevent any large chunks of waste or insoluble masses of waste from becoming lodged in the outlet hose 26.

To facilitate evacuation and for reducing peak loads on the discharge pump 22, one ordinarily skilled in the art will appreciate that it is beneficial to add water, chemicals or other fluids into the waste receptacle 21 to make the waste more watery, thereby ensuring more consistent flow. Such discharge may occur through the use of spray jets 23 as shown in FIG. 3 which are distributed through out the discharge system 20. Such spray jets 23, if included, can also be used during evacuation to ensure that the pump receives is a constant source of fluid to avoid being burned out and after evacuation for cleaning out the discharge system 20, thus promoting the self-cleaning nature of the device 100.

In another embodiment, the entrance of the waste receptacle 21 may include a check valve 21a or a series of check valves 21a to prevent waste (or waste with added fluids) from flowing back into the waste collection system 10. In a further embodiment, a check valve 21b may be in communication with the fluid dispensing system 30, the waste collection system 10 or both to ensure that no further material (waste, fluid or otherwise) is added to the waste receptacle 21 when the check valve 21b is closed. Check valve 21a may additionally prevent waste from flowing back into the device 100 if the device is upset or overturned.

In the embodiment shown in FIG. 3, an evacuation valve 28 prevents waste from escaping from the waste receptacle 21 into the outlet hose 26. Such valve may be opened through electric means (not shown) or may be manually opened such as through the use of an evacuation lever 28a. Alternatively, a number of one way valves (not shown) may be used.

The discharge system 20 self-cleans through the use of at least one spray jet 23, as mentioned above, or through the application of fluids or chemicals throughout the discharge system 20 as provided by water or chemical delivery hoses (for example, through delivery hoses 37 and 38 or 13a and 13b as shown in FIG. 3) which are in fluid communication with the appropriate reservoir (that is, fluid reservoir 31 or chemical reservoir 34) or delivered via spray jets 23 as mentioned above, in which case pump 22 would be used to pump in cleaning fluids or water through the spray jets 23. Such fluid or chemicals may be applied through spray jets 23, as mentioned, through gravity-feed or pump (as may be the case shown with delivery hoses 37 and 38) or through other fluid applicators as known in the art.

Operation

The component systems and elements of the device 100 described above work together in a coordinated fashion. More specifically, once the safe lock 61 is unlocked by the operator, the operator switches a main switch 51 located on a handle 50 of the device 100 which is connected to electronic circuitry (not shown) within the device 100 for making various electrical operations available. Switching the device 100 on activates a motor (not shown) causing the hinged cover lid 11 to open. The cover lid 11 retracts into a recess 60 in the device 100 during operation. Once the device 100 is turned on the operator can pull a vacuum trigger 52 on the handle 50 to activate the motor for controlling the extension and retraction of the intake nozzle 12.

The operator places the intake nozzle 12 within the vicinity of the target waste material. The material is vacuumed into the collection hose 15 as a result of the operation of the vacuum pump 29. The waste material travels through the collection hose 15 into the waste receptacle 21. During the collection phase, the cover grille 19 prevents large material from entering the intake nozzle 12.

The operator may pull a spray trigger 53 (depending upon the nature and state of the waste) to start the fluid delivery pump 32 to supply pressurized chemical solution to the intake nozzle 12 and the collection hose 15 for lubricating the collection hose 15 and also for breaking down the physical, chemical and microbiological composition of the waste material to enhance the device's ability to collect the material and to reduce the waste's foul smell. The chemical solution sprayed into the waste may include a deodorizing and disinfecting function.

Any one of or a combination of waste disintegrating methods (such as those described within the discharge system 20) may also (or alternatively) be employed during the waste collection phase to begin the process of breaking down the waste.

After use, the operator switches off the device 100 which deactivates the vacuum pump 29 and the fluid delivery pump 32 and closes the valves 35, 36 and 39 located within the reservoirs 31 and 34. This activates the motor (not shown) causing the motor to close the cover lid 11 and retract the intake nozzle 12. Upon closure of the cover lid 11, a safety lock 61 is engaged to prevent opening of the cover lid 11 through inadvertence.

The safety lock 61 may optionally serve as a switch which starts the fluid delivery pump 32 for the purpose of supplying chemical solution through fluid delivery hoses 13a and 13b located within the cover lid 11 which then serves as a wash basin 17 for cleaning off waste material from the exterior and interior of the intake nozzle 12. The fluid delivery pump 32 is activated for a predetermined period of time or for a predetermined volume of fluid to ensure proper cleaning of the intake nozzle 12 and cover grille 19. Once the cleaning of the intake nozzle 12 is complete, the fluid delivery pump 32 shuts off and the vacuum pump 29 is activated. This causes the mixed waste material and fluid in the wash basin 17 to be vacuumed into the waste storage receptacle 21 along with the previously vacuumed waste material ensuring that the entire device 100 is automatically cleaned except for the interior of the waste receptacle 21. The vacuum pump 29 shuts off automatically after a predetermined period of time and the device 100 is completely shut off.

Once the device 100 is completely shut off the device 100 is ready for additional use or, in the instance where the waste receptacle 21 has been filled, for the operation of the discharge system.

The waste material may be broken down or disintegrated (or further broken down if similar methods were used during the collection phase) using any one of the methods of disintegrating waste to make it easier to evacuate the waste.

The waste collected by the device 100 may be evacuated by manual release of the evacuation valve 28 using evacuation lever 28a or through electronic means (not shown) activated by pressing discharge button 54. Such activation will also activate the discharge pump 22 and allow the waste to travel from the waste receptacle 21, through the outlet hose 26 where it will be finally discharged through discharge outlet 24. Alternatively, the waste may be evacuated by manual removal of the waste receptacle 21 (e.g. disposable or clean and replace).

During and after the evacuation of the waste a number of additional processes (as described above) may be engaged for lubricating the outlet hose 26 with fluid or chemical, for further liquefying the waste to maintain an even load on the discharge pump 22 or for self-cleaning the discharge system 20.

Upon completion of the evacuation process the evacuation valve 28 can be closed (again, manually or through electric means) which will deactivate the discharge pump 22 and any of the discharge system processes which were engaged.

After the completion of the evacuation process, to a self-clean process for the discharge system can be activated to ensure that the entire collection system and discharge system is cleaned and sanitized after use. This is done by supplying fluid, preferably pressurized fluid such as through spray jets, throughout the discharge system 20 which is subsequently discharged.

Instead of engaging the evacuation process after each collection, the collected waste may be sealed away in the waste receptacle 21 by a conventional check valve shown as evacuation valve 28 or by an electric control valve (not shown) deployed within the deposit outlet such to avoid spillage during use and after use. Additionally, the check valve 21a may close off the discharge system 20 from the rest of the device 100 to prevent waste (or waste with added fluids) from flowing back into the waste collection system 10. Further, the check valve 21b may be in communication with the fluid dispensing system 30, the waste collection system 10 or both to ensure that no further material (waste, fluid or otherwise) is added to the waste receptacle 21 when the check valve 21b is closed.

Exterior Spray System

The device 100 may include an exterior spray system 80 which may include a detachable chemical fluid container 81 in communication with a fluid delivery pump 32. Fluid is dispensed from the fluid container 81 by operating a spray trigger 82 for supplying chemical fluid through external delivery hose 83. A spray nozzle 84 is located in the exterior of the device 100 for spraying environmentally-friendly chemical fluid into the area from where the waste was removed. This facilitates restoration of the area and reduces the effect of the waste and may also be used to clean off exterior portions of the device 100.

Further Embodiments

The device 100 may be provided using an upright embodiment which may include a wheel system 40 for increasing the ease with which the device 100 can be used by increasing its portability. Further, the wheel system 40 may reduce fatigue while operating the device 100. The wheel system 40 may be used to keep the device 100 upright when not in use.

In another embodiment, the device 100 may have its sub-systems divided, split or arranged to enable different embodiments such as for carriage within a back pack, vehicle mount or similar carrying system to facilitate different uses. Additionally, the device's sub-systems may be arranged as a canister-type vacuum.

In a further embodiment, the device 100 may be vehicle-mounted which may involve, as in the embodiment above, dividing, splitting or arranging the device 100 to most suitably arrange it on a vehicle.

The device 100 may use a rechargeable dry cell battery 70 or other portable or known power means for providing the necessary power such as a gasoline motor, on-board electric motor, an AC or other electricity adaptor or any combination or plurality of these.

Any of the above-described embodiments of the present invention are intended to be exemplary only. Alterations, modifications and variations may be effected to the particular embodiments by those of skill in the art without departing from the scope of the invention, which is defined solely by the claims appended hereto.

What is claimed is:

1. A self-evacuating vacuum comprising:
    a waste receptacle in fluid communication with a collection hose and an intake nozzle, the collection hose allowing for solid or liquid waste to travel from the intake nozzle and be deposited into the waste receptacle;
    a discharge outlet;
    an outlet hose to couple the discharge outlet to the waste receptacle;
    a discharge pump coupled to the outlet hose, wherein the discharge pump pumps the solid or liquid waste from the waste receptacle through the outlet hose to the discharge outlet and exterior to the self-evacuating vacuum; and
    a spray jet located in the outlet hose to provide fluid to the interior of the outlet hose.

2. The self-evacuating vacuum of claim 1, further comprising:
    a vacuum pump to provide suction to an intake nozzle, the intake nozzle in fluid communication with a collection hose.

3. The self-evacuating vacuum of claim 2, further comprising:
    a fluid delivery hose to provide fluid to the spray jet located in the outlet hose.

4. The self-evacuating vacuum of claim 1, further comprising:
    a spray jet located in the waste receptacle to provide fluid to the interior of the waste receptacle.

5. The self-evacuating vacuum of claim 1, further comprising:
    rotateable blades within the waste receptacle to disintegrate the waste in the waste receptacle and facilitate evacuation.

6. A self-evacuating vacuum comprising:
    a waste receptacle in fluid communication with a collection hose and an intake nozzle, the collection hose allowing for solid or liquid waste to travel from the intake nozzle and be deposited into the waste receptacle;
    a discharge outlet;
    an outlet hose to couple the discharge outlet to the waste receptacle;
    a discharge pump coupled to the outlet hose, wherein the discharge pump pumps the solid or liquid waste from the waste receptacle through the outlet hose to the discharge outlet and exterior to the self-evacuating vacuum; and
    a spray jet located in the waste receptacle to provide fluid to the interior of the waste receptacle.

7. The self-evacuating vacuum of claim 6, further comprising:
    a vacuum pump to provide suction to an intake nozzle, the intake nozzle in fluid communication with a collection hose.

8. The self-evacuating vacuum of claim 7, further comprising:
    a fluid delivery hose to provide fluid to the spray jet located in the waste receptacle.

9. The self-evacuating vacuum of claim 6, further comprising:
    rotateable blades within the waste receptacle to disintegrate the waste in the waste receptacle and facilitate evacuation.

* * * * *